(12) United States Patent
Gratien et al.

(10) Patent No.: US 7,478,466 B2
(45) Date of Patent: Jan. 20, 2009

(54) DEVICE FOR APPLYING WEATHERSTRIP ON A MOTOR VEHICLE BODY, AND RELATED METHOD

(75) Inventors: Francois Gratien, Les Clayes Sous Bois (FR); Bernard L'Hostis, Rennes (FR); Philippe L'Hostis, legal representative, Rennes (FR); David L'Hostis, legal representative, Rennes (FR); Claire L'Hostis, legal representative, Pau (FR); Jean-Paul Rousse, Reze (FR)

(73) Assignees: Peugeot Citroen Automobiles S.A., Velizy-Villacoublay (FR); Technorop Automation, La Chapelle sur Erdre (FR)

( * ) Notice: Subject to any disclaimer, the term of this patent is extended or adjusted under 35 U.S.C. 154(b) by 316 days.

(21) Appl. No.: 10/511,472

(22) PCT Filed: Apr. 14, 2003

(86) PCT No.: PCT/FR03/01179

§ 371 (c)(1),
(2), (4) Date: Sep. 22, 2005

(87) PCT Pub. No.: WO03/091055

PCT Pub. Date: Nov. 6, 2003

(65) Prior Publication Data

US 2006/0070224 A1 Apr. 6, 2006

(30) Foreign Application Priority Data

Apr. 24, 2002 (FR) .................................. 02 05149

(51) Int. Cl.
*B23P 11/02* (2006.01)
*B23P 21/00* (2006.01)
*B25B 27/14* (2006.01)
*B29C 65/00* (2006.01)
*B66C 23/00* (2006.01)
*H01L 21/67* (2006.01)

(52) U.S. Cl. .......................... 29/450; 29/281.6; 29/451; 29/703; 29/714; 29/717; 156/60; 156/308.2; 414/744.1; 414/800

(58) Field of Classification Search ................... 29/235, 29/281.1, 281.6, 407.05, 451, 702–703, 714, 29/717, DIG. 104, 450; 156/306.6, 308.2, 156/60; 414/744.1, 800; 901/36, 37
See application file for complete search history.

(56) References Cited

U.S. PATENT DOCUMENTS 4,620,354 A 11/1986 Hess et al.

(Continued)

FOREIGN PATENT DOCUMENTS

DE 197 42 257 4/1999

(Continued)

*Primary Examiner*—David P Bryant
*Assistant Examiner*—Alexander P Taousakis
(74) *Attorney, Agent, or Firm*—Leydig, Voit & Mayer, Ltd.

(57) ABSTRACT

A device for applying a weatherstrip to a motor vehicle body, and a related method. The body bears an elongated receiving surface with a predetermined profile. The application device includes a plate for applying the weatherstrip on the receiving surface, a presser pressing the weatherstrip on the receiving surface, and a guide for guiding the application plate on a trajectory along the predetermined profile of the receiving surface The guide includes a programmable articulated mechanical element for moving the application plate, and that is programmable to adapt the trajectory of the application plate to different predetermined profiles corresponding to different vehicles.

8 Claims, 3 Drawing Sheets

U.S. PATENT DOCUMENTS 5,020,278 A * 6/1991 St. Angelo et al. ......... 49/490.1
5,201,106 A * 4/1993 Moore et al. ............. 29/407.05
5,237,741 A * 8/1993 Goedderz .................... 29/819

FOREIGN PATENT DOCUMENTS

DE  100 23 332  11/2001
EP  0 894 563   2/1999

* cited by examiner

DEVICE FOR APPLYING WEATHERSTRIP ON A MOTOR VEHICLE BODY, AND RELATED METHOD

FIELD OF THE INVENTION

The invention concerns, in general, automobile assembly lines and assembly methods.

The invention concerns a device for applying weather stripping on a motor vehicle body, this body carrying an elongated receiving surface of predetermined profile, the weather stripping comprising a thin wing bearing a bonding surface, the shape of which corresponds to the receiving surface and a hollow longitudinal tube connected to the wing, the positioning device comprising a plate for applying the weather stripping bonding surface on the receiving surface, means for pressing the weather stripping on the receiving surface, and means for guiding the application plate on a trajectory along the predetermined profile of the receiving surface, wherein the guide means comprises at least a first means of referencing the body with respect to the positioning device.

BACKGROUND

Devices of this type are known in the prior art, particularly through the patent application FR9809291. This application discloses a device for mounting weather stripping on a vehicle, essentially comprising a template which can be put in contact with the vehicle body; a plate, called a carriage in the patent application, carried by the template and capable of being displaced thereon in order to ensure the positioning of the weather stripping; and a means for guiding and orienting the plate on the template.

The means for guiding and orienting the plate includes three rails connected to the template. The first rail, the shape of which corresponds to the surface receiving the weather stripping, defines the trajectory to be followed by the plate along the vehicle body. The second rail is used to maintain the force for applying the weather stripping on its receiving surface along a direction that is always normal to the receiving surface. The third rail ensures, according to a direction transverse to the vehicle, the correct positioning of the plate with respect to the vehicle so that the weather stripping is perfectly flush with the geometry of the body.

This device is typically used in order to place the weather stripping around the upper part of the door frames of the vehicle. The weather stripping is used, on the one hand, to prevent water from running off along the window or from penetrating into the passenger space and, on the other hand, to limit aerodynamic noise.

This device has been used successfully on automobile assembly lines and has led to a very clear increase in the quality of positioning of the weather stripping.

It enables one to maintain the parameters important for the quality of positioning within the recommended ranges during the entire duration of the operation. In contrast, during an operation of manually applying the weather stripping on the body, it is difficult to maintain a constant positioning quality over the entire surface, and certain portions of the weather stripping adhere poorly. In the long term, this results in detachment of the weather stripping, at least in certain spots.

The main defect of the device of patent application FR9809291 derives from the need to invest in and control, on the same assembly line, a number of tools suited to different car models or to different versions of the same model.

This disadvantage will become increasingly troublesome in the future with the institution of flexible lines, capable of producing an even broader range of vehicles.

SUMMARY OF THE INVENTION

In this context, the present invention aims to reduce the aforementioned disadvantages.

For this purpose, in the device of the invention, the guide means comprises a programmable articulated mechanical means for displacing the application plate and means for programming the articulated mechanical means to adapt the trajectory of the plate to different predetermined profiles corresponding to different types of vehicles.

In a possible embodiment, the application plate is selectively connected to or disconnected from the articulated mechanical means.

Advantageously, the means for pressing the weather stripping can comprise a second actuator which selectively forces the application plate towards the receiving surface.

Preferably, the application plate can comprise a support and a roller for application of the weather stripping on the receiving surface, the application roller rolling on a rolling surface of the thin wing on the side opposite the bonding surface.

For example, the application roller can be mounted so as to rotate freely with respect to the support and can be put in rotation by a drive element carried by the articulated mechanical means.

In the case of peelable weather stripping, the bonding surface of which is coated with an adhesive material before positioning and which is protected by a protective element, the application plate can advantageously carry means for peeling the weather stripping, where the peeling means comprises a roller for winding the element protecting the adhesive material mounted to rotate freely on the support and be rotated by said drive element.

Preferably, the application plate can include some second referencing means to position a downstream end of the weather stripping in a predetermined reference position with respect to the application roller.

For example, the second referencing means can include at least one first arm articulated on the support and an indexing finger connected to the first articulated arm, the indexing finger being mobile between an indexing position, where it is engaged in the hollow tube at the downstream end of the weather stripping when the weather stripping is in the reference position, and a release position, where this indexing finger is released.

Advantageously, the indexing finger can be forced elastically towards its indexing position, where an actuator carried by the articulated mechanical means selectively displaces the indexing finger towards its release position.

Preferably, the application plate can include an upstream guide means for an upstream part of the weather stripping on the end opposite the downstream end, where this upstream guide means is connected to the support and has first and second rollers rolling respectively over the rolling surface and the bonding surface, and third and fourth rollers with shafts parallel and perpendicular to the shafts of the first and second rollers.

For example, the positioning device can comprise feed and return conveyors; and a plurality of application plates that carry weather stripping in the reference position arranged on the feed conveyor in predetermined positions; the articulated mechanical means being programmed to connect to an application plate of the feed conveyor before the weather stripping positioning operation, to deposit the application plate on the return conveyor, and to disconnect from it once the weather stripping positioning operation is finished.

In a second aspect, the invention relates to a process for applying weather stripping on a motor vehicle body, using a positioning device with the advantageous characteristics above.

The method of the invention includes the following steps:

a. programming of the means for programming the articulated mechanical means to adapt the trajectory of the application plate to the predetermined profile corresponding to the vehicle to be treated;

b. preparation by an operator of a plurality of application plates that carry the weather stripping in positions referenced to predetermined positions on the feed conveyor;

c. referencing of the vehicle body with respect to the positioning device;

d. displacement of the articulated mechanical means and connection of said means to a prearranged application plate on the feed conveyor;

e. displacement of the articulated mechanical means and application of the downstream end of the weather stripping at one end of the receiving surface;

f. displacement of the indexing finger towards its release position;

g. positioning of the weather stripping over the entire length of the receiving surface by displacement of the application plate along the predetermined profile;

h. displacement of the articulated mechanical means and depositing of said application plate on the return conveyor;

i. disconnection of the articulated mechanical means and the application plate;

j. repetition of the cycle of operations c to i for other vehicles of the same type;

k. periodically, addition of new application plates on the feed conveyor and ejection of the used application plates of the return conveyor, in masked time with respect to the cycle of operations c to i;

l. resumption of the cycle at step a when switching to a new type of vehicle.

BRIEF DESCRIPTION OF DRAWINGS

Other characteristics and advantages of the invention will emerge clearly from the description given below on an indicative and non-limiting basis with reference to the appended figures, in which.

DETAILED DESCRIPTION

Figure 4:
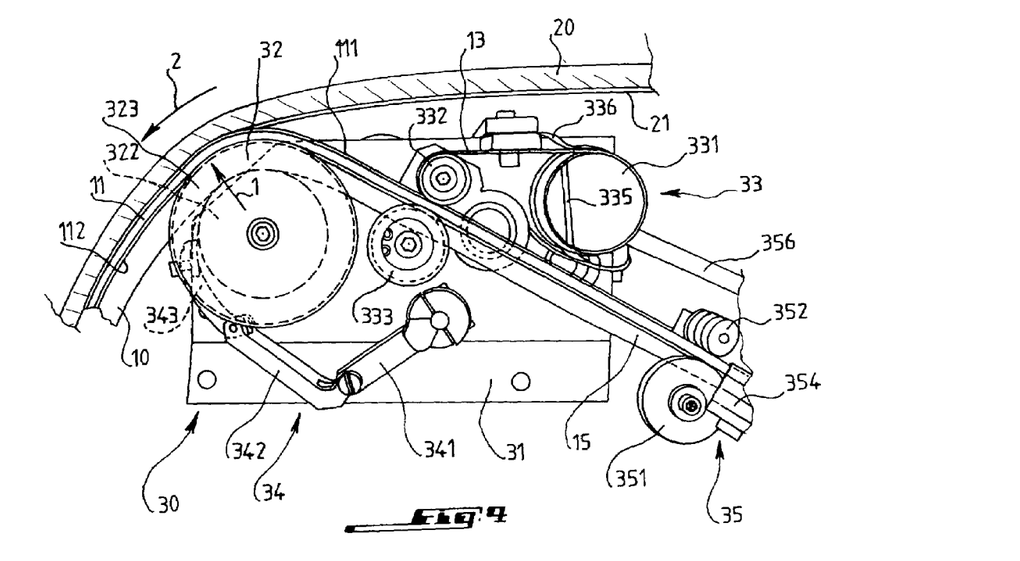
FIG. 4 is a front elevation of the plate of the device of FIG. 1, during the operation of positioning of the weather stripping on the receiving surface.

The invention concerns a device for positioning weather stripping 10 on motor vehicle body 20 (FIG. 4). This body 20 comprises elongated receiving surface 21 of predetermined profile.

Figure 6:
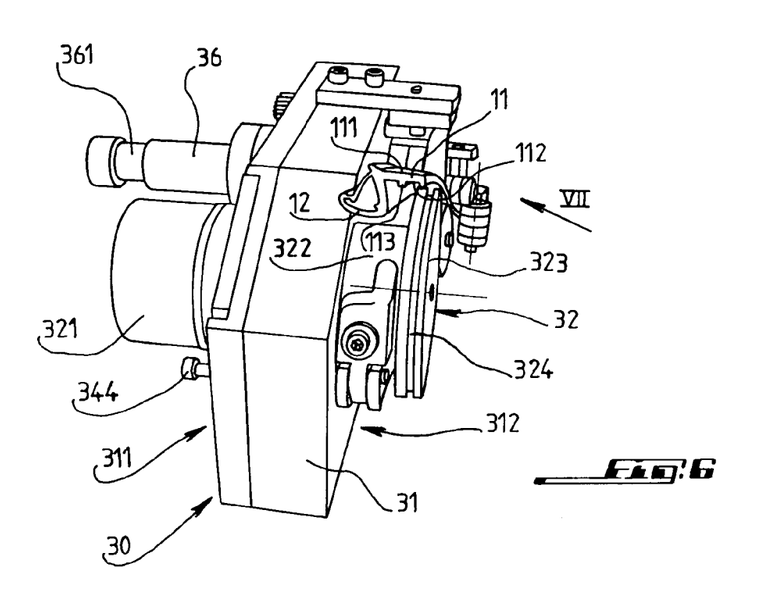
FIG. 6 is a perspective view of the side of the plate of the device of FIG. 1.
Figure 7:
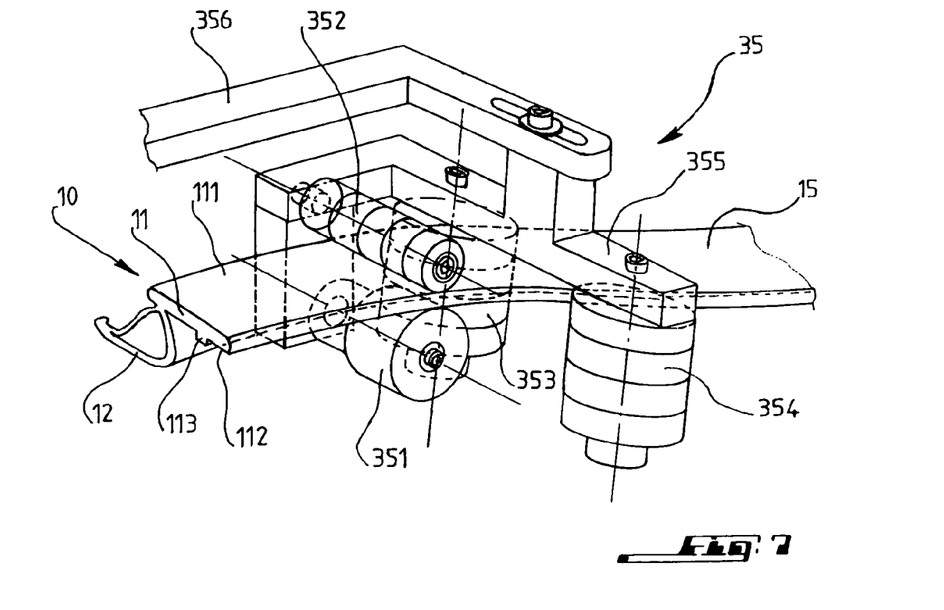
FIG. 7 is a perspective view along arrow VII of FIG. 6 of the upstream guide means for the weather stripping.

As can be seen from FIGS. 6 and 7, weather stripping 10 comprises thin wing 11 bearing bonding surface 111, the shape of which corresponds to receiving surface 21, and hollow longitudinal tube 12 integral with thin wing 11.

Thin wing 11 comprises rolling surface 112 on the side opposite bonding surface 111. Hollow longitudinal tube 12 is connected to thin wing 11 at a transverse end of rolling surface 112, longitudinal rib 113 also being formed on rolling surface 112.

Weather stripping of this type is commonly used in the automobile industry.

The positioning device comprises, in a known manner, plate 30 for application of bonding surface 111 of weather stripping 10 on receiving surface 21, means 40 for pressing weather stripping 10 on receiving surface 21, and means 50 for guiding application plate 30 on a trajectory along the predetermined profile of receiving surface 21.

Guide means 50 includes first means for referencing body 20 of the vehicle with respect to the positioning device.

According to the invention, guide means 50 also comprises programmable articulated mechanical means 52 for displacing application plate 30 and means 53 for programming articulated mechanical means 52 to adapt the trajectory of application plate 30 to different predetermined profiles corresponding to different types of vehicles.

The trajectory is regulated by programming means 53 so that the transverse position of weather stripping 10 with respect to receiving surface 21 is correct, that is, so that weather stripping 10 is flush with respect to body 20.

Programmable articulated mechanical means 52 are typically robots of the type that are already widespread in automobile assembly lines.

Figure 1:
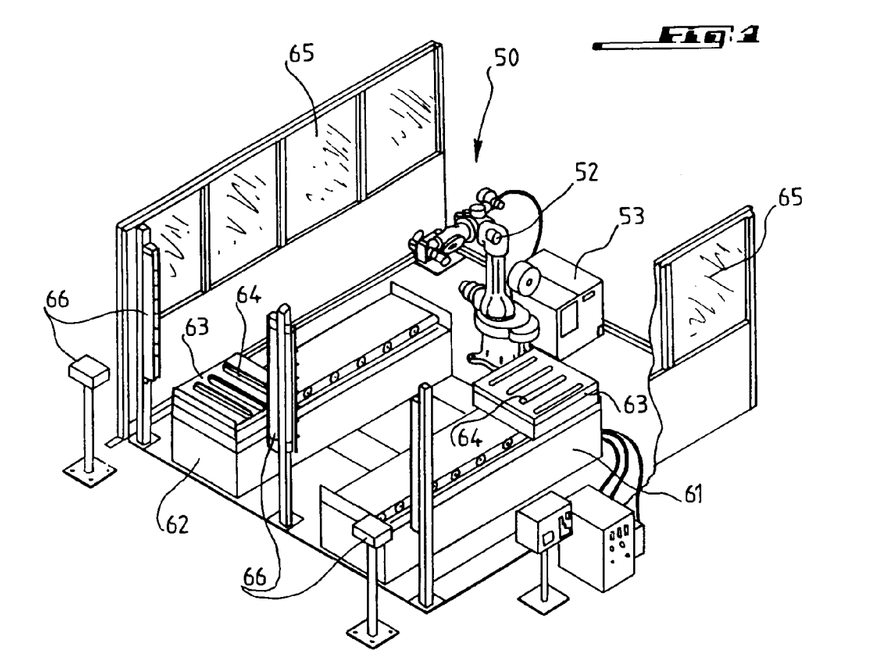
FIG. 1 is a perspective view of the device according to the invention.
Figure 2:
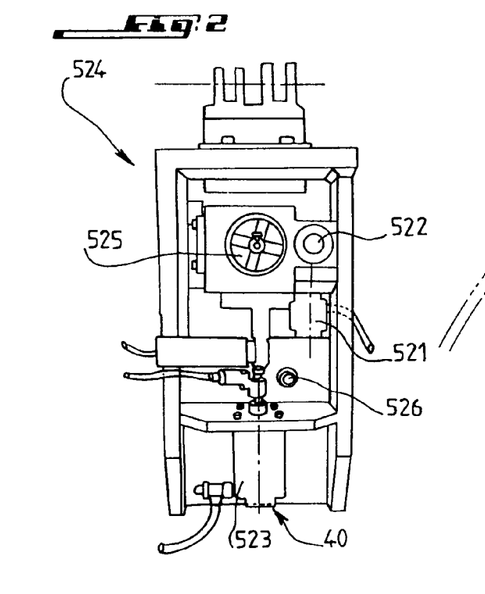
FIG. 2 is a front elevation of the gripping device of the programmable articulated mechanical means of FIG. 1.
Figure 3:
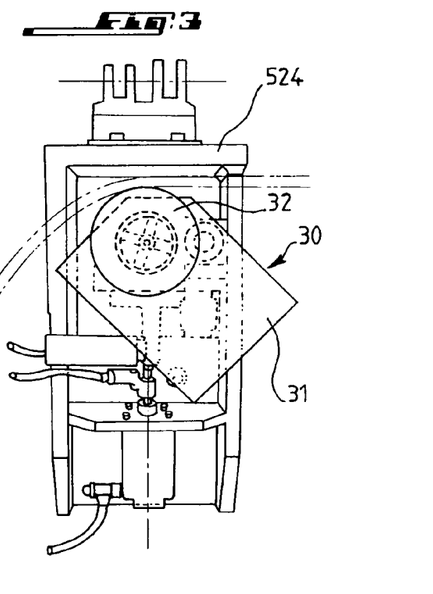
FIG. 3 is a front elevation of the application plate joined to the gripping device of FIG. 2.

As can be seen from FIG. 1, such means comprise a base, at least two arms, and gripping device 524 (FIGS. 2 and 3) carried by one of the arms. Application plate 30 is selectively connected to or disconnected from gripping device 524, as will be described below. Gripping device 524 is represented in FIG. 2. The base, the arms, and gripping device 524 are connected by at least four joints, the axes of which are chosen so that the trajectory of application plate 30 can follow different predetermined profiles of receiving surface 21.

Robots of this type and their programming means 53 are known to the expert in the field and will not be described here in detail.

As can be seen from FIG. 6, application plate 30 comprises support 31 carrying attachment rod 36 on rear surface 311. Groove 361 is formed at a free end of attachment rod 36.

Gripping device 524 of articulated mechanical means 52 comprises first opening 522, the shape of which complements that of rod 36.

Application plate 30 is connected to gripping device 524 by introducing rod 36 into first opening 522 and actuating first actuator 521, which locks rod 36 in position, for example, by engaging an immobilizing piece (not shown) in groove 361.

The disconnection of application plate 30 and gripping device 524 takes place according to the reverse process.

Application plate 30 comprises roller 32 for applying weather stripping 10 on receiving surface 21, carried by front surface 312 of support 31.

Application roller 32 is mounted to rotate freely with respect to support 31 and is placed in rotation by a drive element carried by mechanical means 52.

For this purpose, application roller 32 is connected to first shaft 321 passing through support 31 and projecting from rear surface 311.

Gripping device 524 comprises second opening 525 in which first shaft 321 is engaged when plate 30 is connected to gripping device 524. In this position, first shaft 321 is coupled to said drive element.

Application roller 32 comprises cylinder 322, the diameter of which is relatively smaller, extended by coaxial disk 323, the diameter of which is relatively larger.

Disk 323 comprises peripheral radial groove 324.

During the operation of positioning weather stripping 10, application roller 32 rolls by means of disk 323 over rolling surface 112 of thin wing 11, thus flattening bonding surface 111 on receiving surface 21 of body 20.

Longitudinal rib 113 is engaged in radial groove 324. Hollow tube 12 is guided during the positioning operation by the radial surface of cylinder 322 and by an axial surface of disk 323 located opposite support 31.

Application roller 30, guided by guide means 50, thus moves along the entire receiving surface 21.

Weather stripping 10 is simultaneously pressed against receiving surface 21 by pressing means 40. This means includes second actuator 523 carried by articulated mechanical means 52, which forces application plate 30 towards receiving surface 21. Articulated mechanical means 52 is programmed in such a way that the force of second actuator 523 is applied according to a direction normal to receiving surface 21.

This direction is represented by arrow 1 of FIG. 4.

Second actuator 523 acts, for example, on a rib carried by rear surface 311 of support 31.

According to the advantageous characteristic already described in the patent application FR9809291, application roller 30 is subjected, during the positioning operation, to a torque tending to make it turn faster than a simple free rolling of the roller on the weather stripping.

This has the effect of compressing weather stripping 10 in the longitudinal direction, which reduces or even cancels the elongation of weather stripping 10 resulting from its compression.

In this way, one avoids the risks of long term detachment of the weather stripping, particularly in delicate spots such as rounded parts.

In this way, it is possible to apply high pressures to the weather stripping, which improves its adhesion to the body.

The weather stripping 10 used with the device of the invention is generally peelable. Its bonding surface 111 is coated with a material which is adhesive before positioning. Protective element 13 covers the free surface of the adhesive material over the entire length of bonding surface 111 in order to prevent the bonding surface from becoming soiled and losing its adhesive properties before the beginning of the positioning operation.

Before the beginning of the positioning operation, weather stripping 10 is cut into sections in lengths corresponding to receiving surface 21.

Protective element 13 comprises, at one end of the sections, a tab for grasping it and detaching the protective element from bonding surface 111.

Application plate 30 carries means 33 for peeling weather stripping 10, that is, means for retracting protective element 13 immediately before weather stripping 10 is flattened against receiving surface 21 by the application roller.

Peeling means 33 comprises roller 331 for winding protective element 13, pivot roller 332, and counter roller 333, all mounted to rotate freely on front surface 312 of support 31.

Winding roller 331 is placed in rotation by the same drive element as application roller 32.

For this purpose, roller 331 is connected to a second shaft passing through support 31 and projecting from rear surface 311 of support 31.

A mechanical means rotationally couples the shafts of application roller 32 and winding roller 331. This mechanical means, not represented, can comprise, for example, a belt, a chain, and/or pinion gears carried by the shafts.

Winding roller 331 contains groove 335 in which the tab of protective element 13 is engaged. This operation is done manually, before the beginning of the operations of positioning of a section of weather stripping 10 on a vehicle.

As shown in FIG. 4, protective element 13 is detached from weather stripping 10 a certain distance from application roller 32. It pivots about pivot roller 332 and will be wound around winding roller 331.

Flexible metallic tab 336, connected to support 31, flattens protective element 13 on winding roller 331 approximately at the point where protective element 13 begins to be wound on winding roller 331.

Pivot roller 332 rolls over bonding surface 111 of weather stripping 10, and counter roller 333 rolls over rolling surface 112. Pivot roller 332 and counter roller 333 are located in opposition and thus serve as a guide for weather stripping 10.

In order to ensure very precise positioning of the weather stripping with respect to body 20, guide means 50 comprises first means for referencing the body with respect to the positioning device, and the application plate comprises second means 34 for referencing weather stripping 10 with respect to application roller 32.

The first means for referencing the body with respect to the positioning device is a conventional means used in automobile assembly lines with automated operations.

These first referencing means can include devices for measuring the position of body 20, with contact (by probing) or without contact (by cameras), and/or devices for mechanically referencing the body on fixed supports, and/or devices for continuously resetting the trajectory of the plate with respect to the profile of receiving surface 21.

Such means are known to the expert in the field and will not be described here in detail.

Second means 34 for referencing weather stripping 10 with respect to application roller 32 makes it possible to position downstream end 14 of the section of weather stripping 10 in a predetermined reference position with respect to application roller 32.

The terms, upstream and downstream, are defined with reference to the direction of positioning of the weather stripping sections, the downstream end of the weather stripping being positioned at the start of the operation and the upstream end at the end of the operation.

Second referencing means 34 comprises first arm 341 connected to support 31 by a first joint, intermediate arm 342 connected by a second joint to an end of arm 341, and indexing finger 343 connected by a third joint to an end of intermediate arm 342.

The first, second, and third joints each comprise elastic return means, typically helical springs, tending respectively to bring about the pivoting in the clockwise direction of first arm 341 with respect to support 31, of intermediate arm 342 with respect to first arm 341, and of indexing finger 343 with respect to intermediate arm 342.

Under the effect of these elastic return means, indexing finger 343 is constantly flattened on the radial surface of cylinder 322. This indexing finger 343 points in the direction opposite to that of the rotation of application roller 32, which is represented by arrow 2 in FIG. 4.

Figure 5:
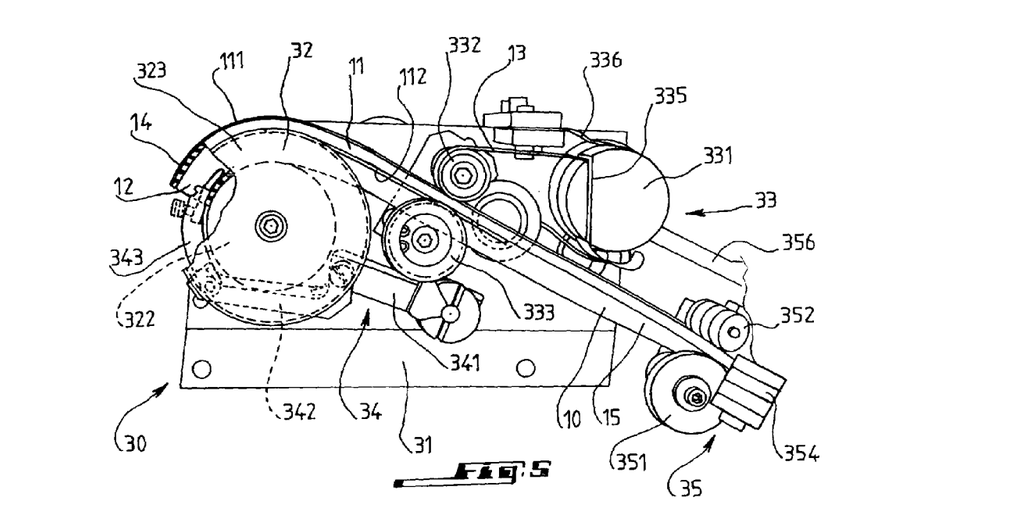
FIG. 5 is a front elevation of the plate of the device of FIG. 1, before the operation of positioning of the weather stripping on the receiving surface, where the weather stripping is maintained in its reference position by the indexing finger.

Indexing finger 343 can be displaced between an indexing position, represented in FIG. 5, where it is engaged in hollow tube 12 at downstream end 14 of weather stripping 10 when said weather stripping is in the reference position, and a release position, represented in FIG. 4, where this indexing finger 343 is released.

As can be observed by comparing FIGS. 4 and 5, it is the rotation of first arm 341 and of intermediate arm 342, which effects the displacement of indexing finger 343, so that it slides along the radial surface of cylinder 322.

This rotation is obtained by an actuator, not represented, carried by articulated mechanical means 52, which selectively displaces first articulated arm 341.

The actuator acts on third shaft 344 (FIG. 6), connected to first articulated arm 341, third shaft 344 being engaged in third opening 526 of gripping device 524 when application plate 30 is connected to it.

Downstream end 14 of weather stripping 10 is manually arranged in its reference position before the beginning of the positioning operation. It is maintained in this reference position by indexing finger 343, which is acted upon by the elastic return means of second referencing means 34.

Indexing finger 343 is displaced towards its release position immediately at the beginning of the positioning of the weather stripping, when downstream end 14 of weather stripping 10 is already flattened on receiving surface 21. The displacement of the indexing finger releases downstream end 14 of the weather stripping.

Application plate 30 also comprises upstream guide means 35 for upstream part 15 of weather stripping 10 on the end opposite downstream end 14.

These upstream guide means 35 is used to prevent weather stripping 10 from whipping objects located in the vicinity of the positioning device and damaging them, particularly body 20 of the vehicle.

As can be seen from FIG. 7, the upstream guide means 35 comprises two pairs of mutually opposing rollers 351 to 354, frame 355 on which the rollers are mounted so as to rotate freely, and connecting arm 356 rigidly connecting frame 355 to support 31.

First and second rollers 351 and 352 roll respectively over rolling surface 112 and bonding surface 111 of weather stripping 10. Third and fourth rollers 353 and 354, whose shafts are perpendicular to first and second rollers 351 and 352, roll on the two lateral surfaces of weather stripping 10.

The positioning device comprises feed conveyor 61 and return conveyor 62, which are arranged near articulated mechanical means 52.

A plurality of application plates 30 that carry weather stripping 10 in the reference position are arranged on feed conveyor 61 in predetermined positions (FIG. 1).

Weather stripping 10 carried by the prepared application plates on feed conveyor 61 is made up of sections sized to the dimensions of receiving surfaces 21 of the vehicles to be treated. The tabs of protective elements 13 of the weather stripping are already inserted in grooves 335 of the winding rollers of their respective plates.

The application plates 30 are therefore ready to be used by articulated mechanical means 52.

The application plates 30 are arranged on cassettes 63 each containing several receiving housings 64. Each housing 64 is intended to accommodate one plate 30.

Each receiving housing 64 comprises raised parts which cooperate with notches formed on support 31 of plate 30. Cassettes 63 are arranged at one end of feed conveyor 61.

Plate 30 is thus referenced with respect to cassette 63 and to gripping device 524.

Articulated mechanical means 52 is programmed to connect to application plate 30 arranged on feed conveyor 61 before the weather stripping positioning operation and to deposit the application plate 30 in empty cassette 63 arranged on return conveyor 62 and disengage from it once the weather stripping positioning operation is finished.

Weather stripping 10 is maintained in its reference position by indexing finger 343 during the trip between feed conveyor 61 and receiving surface 21.

The operators of the positioning device can bring in cassettes containing ready-to-use plates and eject the cassettes containing the used plates in masked time with respect to the weather stripping positioning operation.

Of course, for the purpose of preventing accidents, the positioning device comprises protective shields 65 and means 66 for detection of the presence of operators in the vicinity of the articulated mechanical means, as can be seen from FIG. 1.

The process for positioning the weather stripping corresponding to the positioning device just described will now be explained.

This process comprises the following steps:

a. Programming of means 53 for programming articulated mechanical means 52 to adapt the trajectory of application plate 30 to the predetermined profile corresponding to the vehicle to be treated;

b. Preparation by an operator of a plurality of application plates 30 carrying weather stripping 10 in reference position, in cassettes 63, in predetermined positions on feed conveyor 61, the peeling of protective element 13 from the weather stripping being initiated;

c. Referencing of body 20 of the vehicle with respect to the positioning device;

d. Displacement of articulated mechanical means 52 and connection of the means to prearranged application plate 30 on feed conveyor 61;

e. Displacement of articulated mechanical means 52 and application of downstream end 14 of weather stripping 10 at one end of receiving surface 21;

f. Displacement of indexing finger 343 towards its release position;

g. Positioning of weather stripping 10 over the entire length of receiving surface 21 by displacement of application plate 30 along the predetermined profile and pressing of the weather stripping by means of application roller 32;

h. Displacement of articulated mechanical means 52 and depositing of said application plate 30 on return conveyor 62;

i. Disengagement of articulated mechanical means 52 and the application plate 30;

j. Repetition of the cycle of operations c to i for other vehicles of the same type;

k. Periodically, addition of new application plates 30 in cassettes 63 on feed conveyor 61 and ejection of the used application plates of return conveyor 62, in masked time with respect to the cycle of operations c to i;

l. Resumption of the cycle at step a when switching to a new type of vehicle.

It is therefore indeed understood that the positioning device and the related method make it possible to position weather stripping on vehicles of different models with receiving surfaces of different shapes.

In order to switch from one shape to another, it is sufficient to reprogram the articulated mechanical means.

One thereby eliminates the constraint of having to manage numerous single-model devices for the same manufacturing line, while keeping the advantages mentioned for the device of patent application 98 09 291, particularly the positioning quality.

What is claimed is:

1. An apparatus for applying weather stripping to a motor vehicle body, the body having an elongated receiving surface with a profile, the weather stripping comprising a thin wing having a bonding surface corresponding to the receiving surface and a hollow longitudinal tube connected to the wing, the apparatus comprising:

an application plate for application of the bonding surface of the weather stripping to the receiving surface;

means for pressing the weather stripping against the receiving surface;

means for guiding the application plate over a trajectory along the profile of the receiving surface; and guide means comprising first means of referencing the body of the vehicle with respect to the apparatus, wherein the guide means comprises programmable articulated mechanical means for displacing the application plate and means for programming the articulated mechanical means to adapt the trajectory of the application plate to different profiles corresponding to different vehicles, the application plate is selectively connected to and disconnected from the articulated mechanical means and comprises a support and an application roller for application of the weather stripping to the receiving surface, the application roller rolling on a rolling surface of the thin wing on a side of the wing opposite the bonding surface, the application roller rotates freely with respect to the support and is rotated by a drive element carried by the articulated mechanical means, the bonding surface of the weather stripping is coated with an adhesive material that is protected by a protective element, and the application plate includes means for peeling the protective element from the weather stripping, the means for peeling comprising a peeling roller for winding the protective element, rotating freely on the support, and rotated by the drive element.

2. The apparatus according to claim 1, wherein the means for pressing the weather stripping includes an actuator which selectively forces the application plate towards the receiving surface.

3. The apparatus according to claim 1, wherein the application plate comprises second means of referencing for positioning a downstream end of the weather stripping in a predetermined reference position with respect to the application roller.

4. An apparatus for applying weather stripping to a motor vehicle body, the body having an elongated receiving surface with a profile, the weather stripping comprising a thin wing having a bonding surface corresponding to the receiving surface and a hollow longitudinal tube connected to the wing, the apparatus comprising:

an application plate for application of the bonding surface of the weather stripping to the receiving surface;

means for pressing the weather stripping against the receiving surface;

means for guiding the application plate over a trajectory along the profile of the receiving surface; and guide means comprising first means of referencing the body of the vehicle with respect to the apparatus, wherein the guide means comprises programmable articulated mechanical means for displacing the application plate and means for programming the articulated mechanical means to adapt the trajectory of the application plate to different profiles corresponding to different vehicles, the application plate is selectively connected to and disconnected from the articulated mechanical means and comprises a support and an application roller for application of the weather stripping to the receiving surface, the application roller rolling on a rolling surface of the thin wing on a side of the wing opposite the bonding surface, and the application plate comprises second means of referencing for positioning a downstream end of the weather stripping in a predetermined reference position with respect to the application roller, the second means of referencing including at least one first arm articulated on the support, and an indexing finger connected to the first articulated arm, the indexing finger being displaceable between an indexing position, engaging the hollow tube at the downstream end of the weather stripping when the weather stripping is in the reference position, and a release position, where the indexing finger is released.

5. The apparatus according to claim 4, wherein the indexing finger is urged elastically towards the indexing position, and including an actuator carried by the articulated mechanical means and selectively moving the indexing finger towards the release position.

6. An apparatus for applying weather stripping to a motor vehicle body, the body having an elongated receiving surface with a profile, the weather stripping comprising a thin wing having a bonding surface corresponding to the receiving surface and a hollow longitudinal tube connected to the wing, the apparatus comprising:

an application plate for application of the bonding surface of the weather stripping to the receiving surface;

means for pressing the weather stripping against the receiving surface;

means for guiding the application plate over a trajectory along the profile of the receiving surface; and guide means comprising first means of referencing the body of the vehicle with respect to the apparatus, wherein the guide means comprises programmable articulated mechanical means for displacing the application plate and means for programming the articulated mechanical means to adapt the trajectory of the application plate to different profiles corresponding to different vehicles, the application plate is selectively connected to and disconnected from the articulated mechanical means and comprises a support and an application roller for application of the weather stripping to the receiving surface, the application roller rolling on a rolling surface of the thin wing on a side of the wing opposite the bonding surface, the application plate comprises second means of referencing for positioning a downstream end of the weather stripping in a predetermined reference position with respect to the application roller, and the application plate comprises upstream guide means for an upstream part of the weather stripping at an end opposite a downstream end, the upstream guide means being connected to the support and comprising first and second rollers rolling respectively over the rolling surface and the bonding surface, and third and fourth rollers with shafts respectively parallel and perpendicular to shafts of the first and second rollers.

7. An apparatus for applying weather stripping to a motor vehicle body, the body having an elongated receiving surface with a profile, the weather stripping comprising a thin wing having a bonding surface corresponding to the receiving surface and a hollow longitudinal tube connected to the wing, the apparatus comprising:

a plurality of application plates for application of the bonding surface of the weather stripping to the receiving surface;

means for pressing the weather stripping against the receiving surface;

means for guiding the application plate over a trajectory along the profile of the receiving surface;

guide means comprising first means of referencing the body of the vehicle with respect to the apparatus, wherein the guide means comprises programmable articulated mechanical means for displacing the application plate and means for programming the articulated mechanical means to adapt the trajectory of the application plate to different profiles corresponding to different vehicles, and the application plate is selectively connected to and disconnected from the articulated mechanical means and comprises a support and an application roller for application of the weather stripping to the receiving surface, the application roller rolling on a rolling surface of the thin wing on a side of the wing opposite the bonding surface, and the application plate comprises second means of referencing for positioning a downstream end of the weather stripping in a predetermined reference position with respect to the application roller;

a feed conveyor; and a return conveyor, wherein the plurality of application plates carries the weather stripping in the reference position and are arranged on the feed conveyor in predetermined positions, and the articulated mechanical means is programmed to connect to the application plates of the feed conveyor before positioning of the weather stripping, to deposit the application plates on the return conveyor, and to disconnect from the application plates once the weather stripping positioning is finished.

8. A method for applying weather stripping to a motor vehicle body, using the apparatus according to claim 7, including:

a. programming the articulated mechanical means to adapt the trajectory of the application plate to the profile corresponding to the vehicle to be treated;

b. preparing the plurality of application plates carrying the weather stripping in the reference position in predetermined positions on the feed conveyor;

c. referencing the body of the vehicle with respect to the apparatus;

d. displacing the articulated mechanical means and connecting the articulated mechanical means to prearranged application plates on the feed conveyor;

e. displacing the articulated mechanical means and application of the downstream end of the weather stripping to one end of the receiving surface;

f. displacing an indexing finger towards the release position;

g. positioning the weather stripping over all of the receiving surface by displacing the application plate along the profile;

h. displacing the articulated mechanical means and depositing the application plate on the return conveyor;

i. displacing the articulated mechanical means and the application plate;

j. repeating steps c to i for other similar vehicles;

k. periodically, adding new application plates to the feed conveyor and ejecting used application plates from the return conveyor, in masked time with respect to steps c to i; and l. resuming at step a when switching to a different vehicle.

* * * * *